(12) United States Patent
Ainslie et al.

(10) Patent No.: US 9,235,324 B2
(45) Date of Patent: Jan. 12, 2016

(54) TOUCH INTERPRETATION FOR DISPLAYED ELEMENTS

(75) Inventors: Alex Ainslie, San Francisco, CA (US); John Nicholas Jitkoff, Palo Alton, CA (US)

(73) Assignee: Google Inc., Mountain View, CA (US)

( * ) Notice: Subject to any disclaimer, the term of this patent is extended or adjusted under 35 U.S.C. 154(b) by 222 days.

(21) Appl. No.: 13/464,884

(22) Filed: May 4, 2012

(65) Prior Publication Data

US 2015/0242067 A1  Aug. 27, 2015

(51) Int. Cl.
*G06F 3/0482* (2013.01)
*G06F 3/0481* (2013.01)
*G06F 3/0484* (2013.01)
*G06F 3/0488* (2013.01)

(52) U.S. Cl.
CPC .......... *G06F 3/0482* (2013.01); *G06F 3/04817* (2013.01); *G06F 3/04842* (2013.01); *G06F 3/04845* (2013.01); *G06F 3/04883* (2013.01)

(58) Field of Classification Search
CPC ...................................................... G06F 3/048
See application file for complete search history.

(56) References Cited

U.S. PATENT DOCUMENTS

| | | | | |
|---|---|---|---|---|
| 6,111,573 | A * | 8/2000 | McComb et al. | 715/763 |
| 6,362,837 | B1 * | 3/2002 | Ginn | 715/751 |
| 7,479,949 | B2 * | 1/2009 | Jobs et al. | 345/173 |
| 7,614,008 | B2 | 11/2009 | Ording | |
| 7,843,427 | B2 * | 11/2010 | Ording et al. | 345/157 |
| 8,381,118 | B2 * | 2/2013 | Minton | 715/773 |
| 8,631,345 | B2 * | 1/2014 | Kawaguchi | 715/790 |
| 2002/0024539 | A1 * | 2/2002 | Eleftheriadis et al. | 345/765 |
| 2004/0090470 | A1 * | 5/2004 | Kim et al. | 345/846 |
| 2007/0053308 | A1 * | 3/2007 | DuMas et al. | 370/254 |
| 2010/0066694 | A1 | 3/2010 | Jonsdottir | |
| 2010/0171712 | A1 * | 7/2010 | Cieplinski et al. | 345/173 |
| 2011/0074677 | A1 * | 3/2011 | Ording et al. | 345/158 |
| 2011/0197153 | A1 | 8/2011 | King et al. | |
| 2011/0202855 | A1 * | 8/2011 | Ikegami | G06F 11/3688 715/762 |
| 2011/0225524 | A1 | 9/2011 | Cifra | |
| 2011/0298720 | A1 | 12/2011 | Nguyen et al. | |
| 2011/0302519 | A1 * | 12/2011 | Fleizach et al. | 715/773 |
| 2011/0319139 | A1 * | 12/2011 | Kondo | 455/566 |
| 2012/0140255 | A1 * | 6/2012 | Tanaka | G06F 9/445 358/1.13 |
| 2012/0164971 | A1 * | 6/2012 | Choi | H04M 1/72566 455/405 |
| 2012/0216139 | A1 * | 8/2012 | Ording et al. | 715/773 |
| 2012/0236036 | A1 * | 9/2012 | Kao | 345/661 |
| 2012/0240075 | A1 * | 9/2012 | Kim et al. | 715/776 |
| 2012/0278722 | A1 * | 11/2012 | Raleigh et al. | 715/735 |
| 2012/0297342 | A1 * | 11/2012 | Jang et al. | 715/823 |

(Continued)

*Primary Examiner* — Kumar Patel
*Assistant Examiner* — Sejoon Ahn
(74) *Attorney, Agent, or Firm* — McDermott Will & Emery LLP

(57) ABSTRACT

A machine-implemented method for processing touch elements of an application of a device is provided. The method includes receiving application data associated with the application, the application data providing for the touch elements, each of the touch elements comprising an activation area configured to receive a user input and to trigger at least one function of the application upon receiving the user input. The method further includes determining, from the application data, that plural ones of the touch elements are for display in a group in the application; and classifying, in response to the determining, each of the touch elements of the group into two or more categories based on the application function of the touch element. The method further includes defining a size of the activation area for at least one of the touch elements based on the classification.

20 Claims, 6 Drawing Sheets

(56) References Cited

U.S. PATENT DOCUMENTS

| | | | |
|---|---|---|---|
| 2013/0152017 A1* | 6/2013 | Song et al. | 715/811 |
| 2013/0227439 A1* | 8/2013 | Shin | G06F 3/048 715/758 |
| 2013/0268895 A1* | 10/2013 | Yamaki et al. | 715/835 |
| 2014/0129929 A1* | 5/2014 | Kim et al. | 715/257 |
| 2014/0173509 A1* | 6/2014 | Wu | G06F 3/04842 715/800 |
| 2014/0192004 A1* | 7/2014 | Andersson | G06F 3/0237 345/173 |

\* cited by examiner

TOUCH INTERPRETATION FOR DISPLAYED ELEMENTS

FIELD

The subject technology generally relates to touch screen devices and, in particular, relates to touch interpretation for elements displayed on a touch screen device.

BACKGROUND

A user device, such as a mobile phone, tablet, or laptop, may utilize a touch sensitive user interface, such as a touch-sensitive screen, to receive user input. The user input may comprise gestures or touch. The device may be configured to launch and run one or more applications or software.

One or more of the applications may include a user interface configured to operate with the touch-sensitive screen. The user interface may include touch elements that are displayed to the user and configured to perform an application function based on user input.

SUMMARY

The disclosed subject matter relates to a machine-implemented method for processing touch elements of an application of a device. The method comprises receiving application data associated with the application, the application data providing for the touch elements, each of the touch elements comprising an activation area configured to receive a user input and to trigger at least one function of the application upon receiving the user input. The method also comprises determining, from the application data, that plural ones of the touch elements are for display in a group in the application. The method also comprises classifying, in response to the determining, each of the touch elements of the group into two or more categories based on the application function of the touch element. The method further comprises defining a size of the activation area for at least one of the touch elements based on the classification.

The disclosed subject matter further relates to a device comprising a touch screen, one or more processors, and a machine-readable medium comprising instructions stored therein, which when executed by the processors, cause the processors to perform operations comprising determining, from application data associated with an application for the device, that a plurality of touch elements are for display in a group in the application, wherein each of the touch elements comprises an activation area configured to receive a user input and to trigger at least one function of the application upon receiving the user input. The operations further comprise classifying, in response to the determining, each of the touch elements of the group into two or more categories based on the application function of the touch element, and defining a size of the activation area for at least one of the touch elements based on the classification. The operations also comprise allocating a portion of the activation area of at least one of the touch elements to another touch element.

The disclosed subject matter also relates to a machine-readable medium comprising instructions stored therein, which when executed by a system, cause the system to perform operations comprising receiving application data associated with an application for a device, the application data providing for multiple touch elements, each of the touch elements comprising an activation area configured to receive a user input. The operations also comprise determining, from the application data, that plural ones of the touch elements are for display in a group in the application. The operations further comprise classifying, in response to the determining, each of the touch elements of the group into two or more categories, and allocating a portion of the activation area of at least one touch element to an adjacent touch element based on the classification.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The disclosed subject matter describes systems and techniques for processing touch elements of an application of a touch screen device. Application data associated with the display of multiple touch elements is received. Each of the touch elements has an activation area that is configured to receive a user input, and upon receiving the user input, configured to trigger at least one application function. A determination is made if the application data includes touch elements that are to be displayed in a group. If the application data includes touch elements that are to be displayed in a group, each of the touch elements that are displayed in the group are classified into two or more categories based on a touch element's application function. A size of the activation area of at least one of the touch elements may be defined based on the classification.

Figure 1:
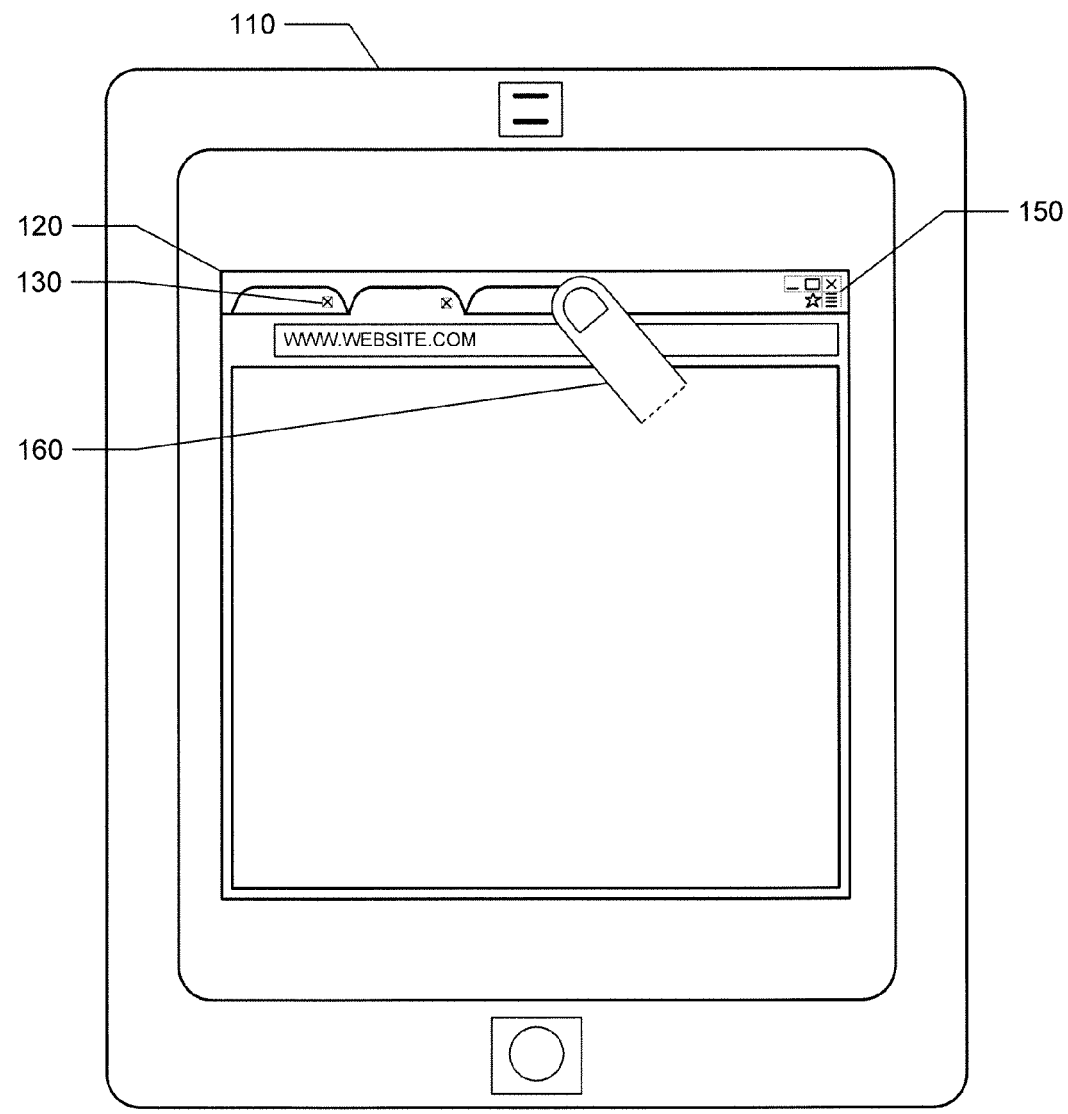
FIG. 1 illustrates an example of a touch screen device running an application.

FIG. 1 illustrates an example of a touch screen device 110 running an application 120. The device 110 may be a mobile phone, PDA, portable media player, tablet, laptop, or other appropriate computing device, and may utilize a touch sensitive user interface, such as a touch-sensitive screen, to receive user input 160. The touch screen of the device 110 may be built into the device itself, or can be electronically connected to the device (e.g., as a peripheral device). The user input 160 may comprise gestures or touch. In some example aspects, the device 110 may be any machine with appropriate hardware/software to launch and run one or more applications 120 or software.

One or more of the applications 120 may include application data comprising a graphical user interface. The application 120 may thus, be configured to receive user input 160 using the graphical user interface and the touch-sensitive screen. The application's 120 graphical user interface may include touch elements 130 that are displayed to the user and configured to trigger an application function based on user input 160. The touch elements 130 may also be displayed in a cluster or a group 150, as discussed further below.

Figure 2A:
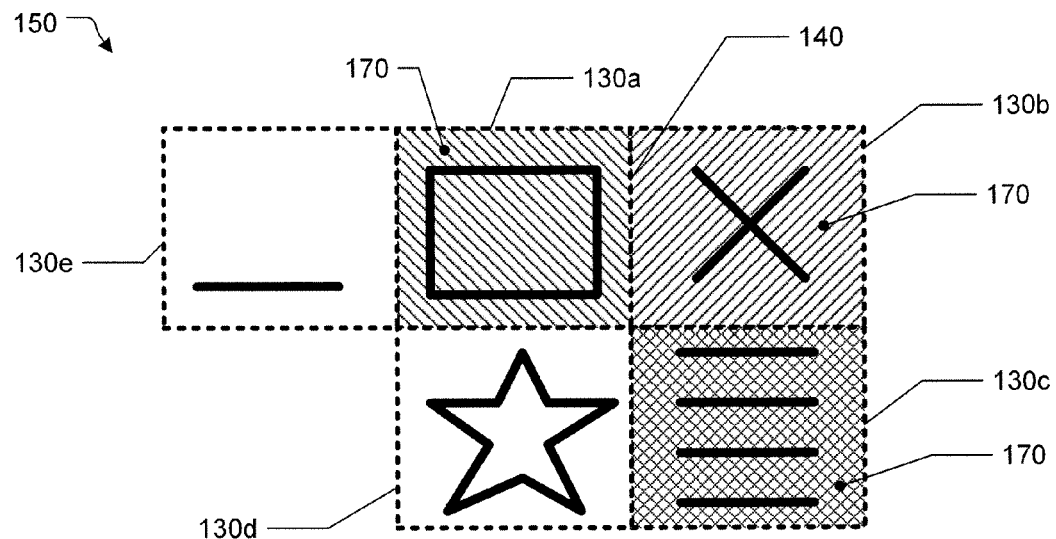
FIG. 2A illustrates an example of a group of touch elements.

FIG. 2A illustrates an example of a group 150 of touch elements 130a-e. Each touch element 130a-e has an activation area 170. For example, in the group 150, each touch element 130a-e has an activation area larger than 48×48 pixels. The activation area 170 is generally outlined by a border 140, which can assist the user in ascertaining the boundaries of the activation area 170 of each touch element 130a-e. The user may, therefore, activate a touch element 130a-e by touching a region on the touch-sensitive screen that is within the corresponding activation area 170 of the touch element 130a-e, as defined by the border 140. Activation of the touch element 130a-e causes the application to perform the corresponding application function.

A touch element 130a-e may be associated with one or more application functions. For example, a touch element 130a-e associated with a web browsing application 120 may be configured to refresh a web page, open a new tab, close a displayed tab, add a bookmark, minimize the application, navigate within a website, move forward or backward within a tab, or exit the application.

Touch elements 130a-e that are displayed in a group 150 on the touch screen of the device 110, may be arranged in close proximity to each other, as shown in FIGS. 2A-2D. Because of the proximity of neighboring touch elements, the user may accidentally or inadvertently cause an adjacent or neighboring touch element to be activated. If the accidentally activated touch element causes the application to perform a destructive function, e.g., delete, close, exit, or an action that a user may want to "undo," then the user may lose data that the user did not otherwise intend to lose.

According to various aspects of the subject technology, a system for reducing the occurrence of inadvertent activation of a touch element 130a-e is provided. A determination is made if the application data includes touch elements 130a-e that are to be displayed in a group 150. If the application data includes touch elements 130a-e that are to be displayed in a group 150, each of the touch elements 130a-e that are displayed in the group are classified into two or more categories based on a touch element's corresponding application function. If a touch element's corresponding application function involves a destructive function, then the size of the activation area 170 of at least one of the touch elements may be defined based on the classification.

Figure 2B:
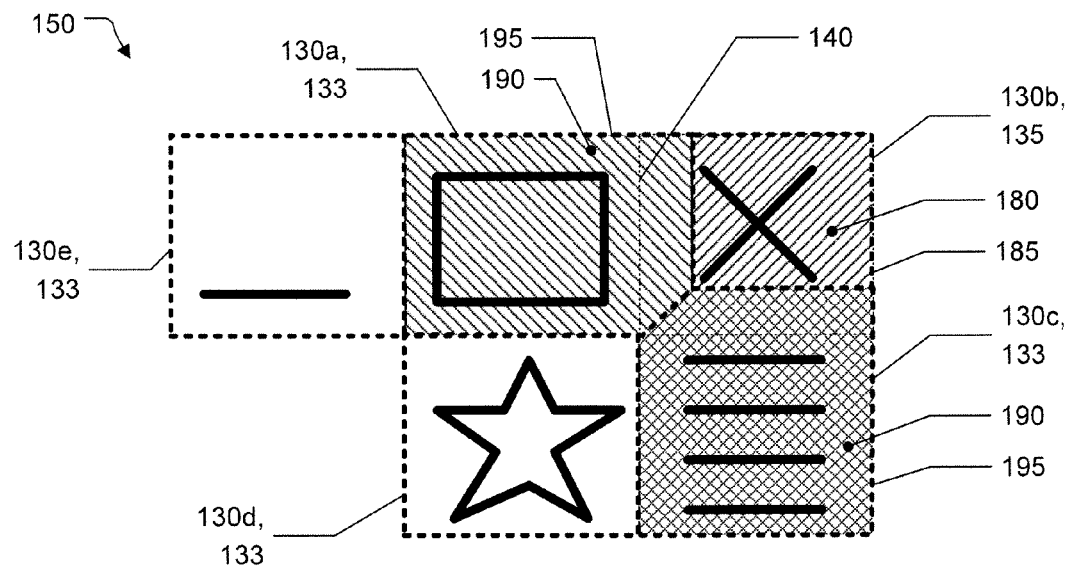
FIG. 2B illustrates an example of a group of touch elements with an altered activation area.
Figure 2C:
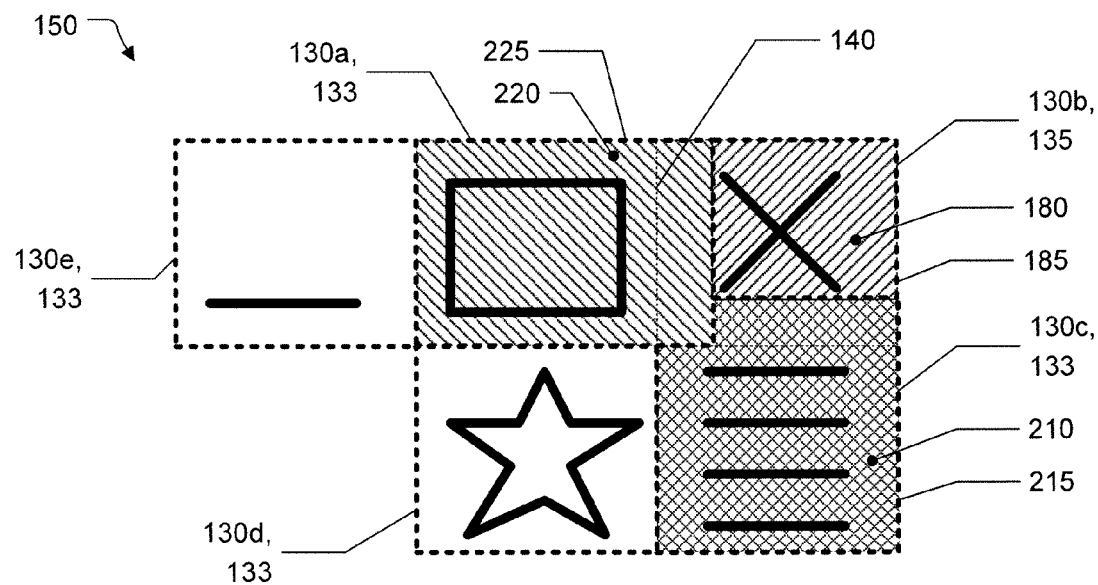
FIG. 2C illustrates another example of a group of touch elements with an altered activation area.
Figure 2D:
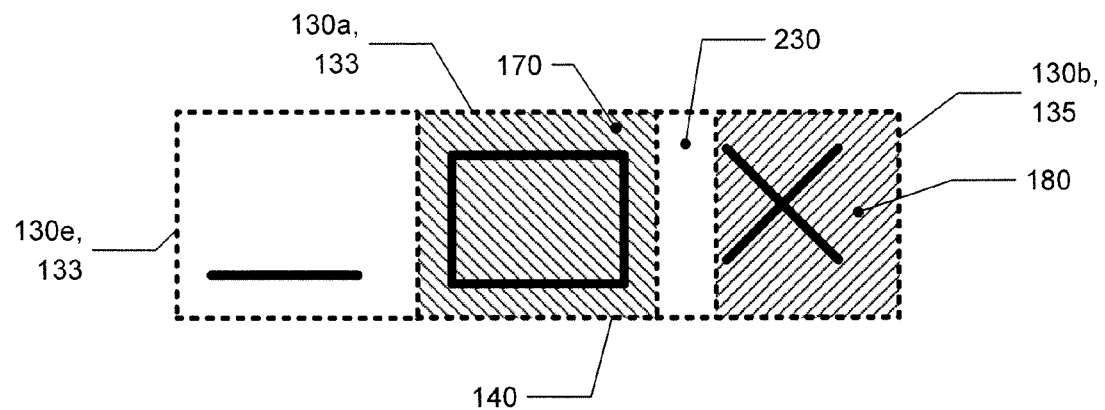
FIG. 2D illustrates another example of a group of touch elements with an altered activation area.

FIGS. 2B-2D illustrate an example of a group 150 of touch elements 130a-e having an altered activation area. As discussed above, the application 120 may comprise application data having a graphical user interface that includes a group 150 of touch elements 130a-e that is displayed on the touch screen of the device 110.

In example aspects, the application 120 may be configured to determine if the application data includes a group 150 of touch elements 130a-e. In another example, the device 110 may be configured to determine if the application data includes a group 150 of touch elements 130a-e. In determining that the application data includes a group 150 of touch elements 130a-e, the application 120 or the device 110 may classify each of the touch elements 130a-e displayed in the group 150 into two or more categories based on the corresponding application function of each touch element 130a-e.

In one example, the application 120 or the device 110 may classify all the touch elements 130a-e displayed in the group 150 into a low priority category and a high priority category. Priority of the touch elements 130a-e may be based on a frequency of use. The application 120 or the device 110 may, therefore, be configured to monitor the user input 160 to determine which touch elements 130a-e are more frequently used. Those touch elements 130a-e that are frequently used are given the high priority, while those touch elements 130a-e which are seldom used are given the low priority classification.

In another example, the application 120 or the device 110 may classify all the touch elements 130a-e displayed in the group 150 as either destructive (e.g., delete, close, exit, or those functions which the user may want to "undo") or non-destructive touch elements. For example, referring to FIG. 2B, the group 150 includes touch element 130a for maximizing the view of the application 120, touch element 130b for exiting the application 120, touch element 130c for viewing the settings of the application 120, touch element 130d for adding favorites to the application, and touch element 130e for minimizing the view of the application 120. The application 120 or the device 110 may classify the touch elements 130a, 130c, 130d, and 130e associated with maximizing the view of the application 120, viewing the settings of the application 120, adding favorites to the application 120, and minimizing the view of the application 120, as non-destructive touch elements 133. The application 120 or the device 110 may classify the touch element 130b associated with exiting the application 120 as a destructive touch element 135.

Touch elements 130a-e that are classified as destructive or low priority 135 may be interpreted differently than touch elements that are classified as non-destructive or high priority 133. For example, the size of the activation area of the touch elements may be defined based on the classification of the touch elements 130a-e. Referring to FIG. 2B, an activation area 180 of the destructive or low priority touch element 135 may be reduced, while an activation area 190 of adjacent non-destructive or high priority touch elements 133 may be increased. By reducing the activation area 180 of the destructive or low priority touch element 135, inadvertent activation of the destructive or low priority touch element 135 may be reduced, particularly in circumstances where the destructive or low priority touch element 135 is adjacent to one or more non-destructive or high priority touch elements 133, such as touch elements 130a and 130c.

The reduced activation area 180 of the destructive or low priority touch element 135, is defined by a border 185 that is not displayed to the user. The increased activation area 190 of the non-destructive or high priority touch element, is defined by a border 195 that is not displayed to the user. Original border 140, which remains unchanged, is displayed to the user. In other words, each touch element 130*a-e* is surrounded by the same displayed border 140, as is shown in FIG. 2A, regardless of the size of the touch element's corresponding activation area.

The activation area 180 of the destructive or low priority touch element 135 may be reduced from 48×48 pixels to 40×40 pixels. The activation area 180, however, is not limited to this size and may comprise other sizes. To further reduce the likelihood that the destructive or low priority touch element 135 may be inadvertently activated, the reduced activation area 180 may comprise an area of the touch element 135 that is furthest away from the adjacent touch elements 133.

One or more portions of the activation area formerly comprising the destructive or low priority touch element 135 may be reapportioned to one or more adjacent non-destructive or high priority touch elements 133. For example, referring to FIG. 2B, the activation area 190 of two adjacent non-destructive or high priority touch elements 130*a*, 130*c* may be equally increased. Accordingly, the activation area 190 may include a five-sided shape having a 45 degree angle at one corner. The activation area 190, however, is not limited to this size or shape and may comprise other sizes and shapes.

For example, referring to FIG. 2C, a first activation area 220 of a first adjacent non-destructive or high priority touch element 130*a* may be larger than a second activation area 210 of a second adjacent non-destructive or high priority touch element 130*c*. The first activation area 220 may be defined by a border 225 and the second activation area 210 may be defined by a border 215. The first activation area 220 may include a four-sided shape and the second activation area 210 may include a 6 sided-shape. The first and second activation areas 220, 210 however, are not limited to this size or shape and may comprise other sizes and shapes.

In example aspects, the activation area formerly comprising the destructive or low priority touch element 135 may be reapportioned to adjacent non-destructive or high priority touch elements 133 based on an allocation priority. For example, each touch element 130*a-e* displayed in the group 150 may be prioritized based on its corresponding application function. Destructive touch elements 135 may be given the lowest allocation priority, while touch elements associated with common application functions may be given the highest allocation priority. Touch elements which perform other, less-common, application functions may be given an intermediate allocation priority. By allocating the activation area formerly comprising the destructive or low priority touch element 135 to adjacent non-destructive or high priority touch elements 133 based on the allocation priority, the likelihood of inadvertently activating a seldom used touch element may be reduced.

For example, referring to FIG. 2C, the activation area 220 may be associated with a touch element having a common application function, while the activation area 210 may be associated with a touch element having a less-common application function. Accordingly, a larger proportion of the activation area formerly comprising the destructive or low priority touch element 135 is reapportioned to the activation area 220, while a smaller proportion of the activation area formerly comprising the destructive or low priority touch element 135 is reapportioned to the activation area 210. Therefore, the touch element associated with the common application function has a larger activation area 220 than the touch element associated with the less-common application function having a smaller activation area 210, and both the activation areas 220, 210 of the touch elements 130*a*, 130*c* are larger than the activation area 180 of the touch element 130*b*.

In example aspects, the activation area formerly comprising the destructive or low priority touch element 135 may not be reapportioned to adjacent touch elements 133. For example, referring to FIG. 2D, the activation area 230 formerly comprising the destructive or low priority touch element 135 may simply be "dead" and be unassociated with any touch elements 130*a*, 130*e*. In this example, the destructive or low priority touch element 135 may have the activation area 180 and the adjacent non-destructive or high priority touch element 130*a* may have the activation area 170.

The user may activate the destructive or low priority touch element 135 by touching an area within the reduced activation area 180. If the user touches an area that is within the border 140 of the destructive or low priority touch element 135, but adjacent to the non-destructive or high priority touch elements 133, then the area touched will likely belong to the adjacent non-destructive or high priority touch elements 133 even though the area touched may be within the border 140 of the destructive touch element 135. Inadvertent activation of the destructive or low priority touch element 135 is thus prevented. If, however, the user touches an area of the reduced activation area 180, then the destructive or low priority touch element 135 will be activated.

Figure 3:
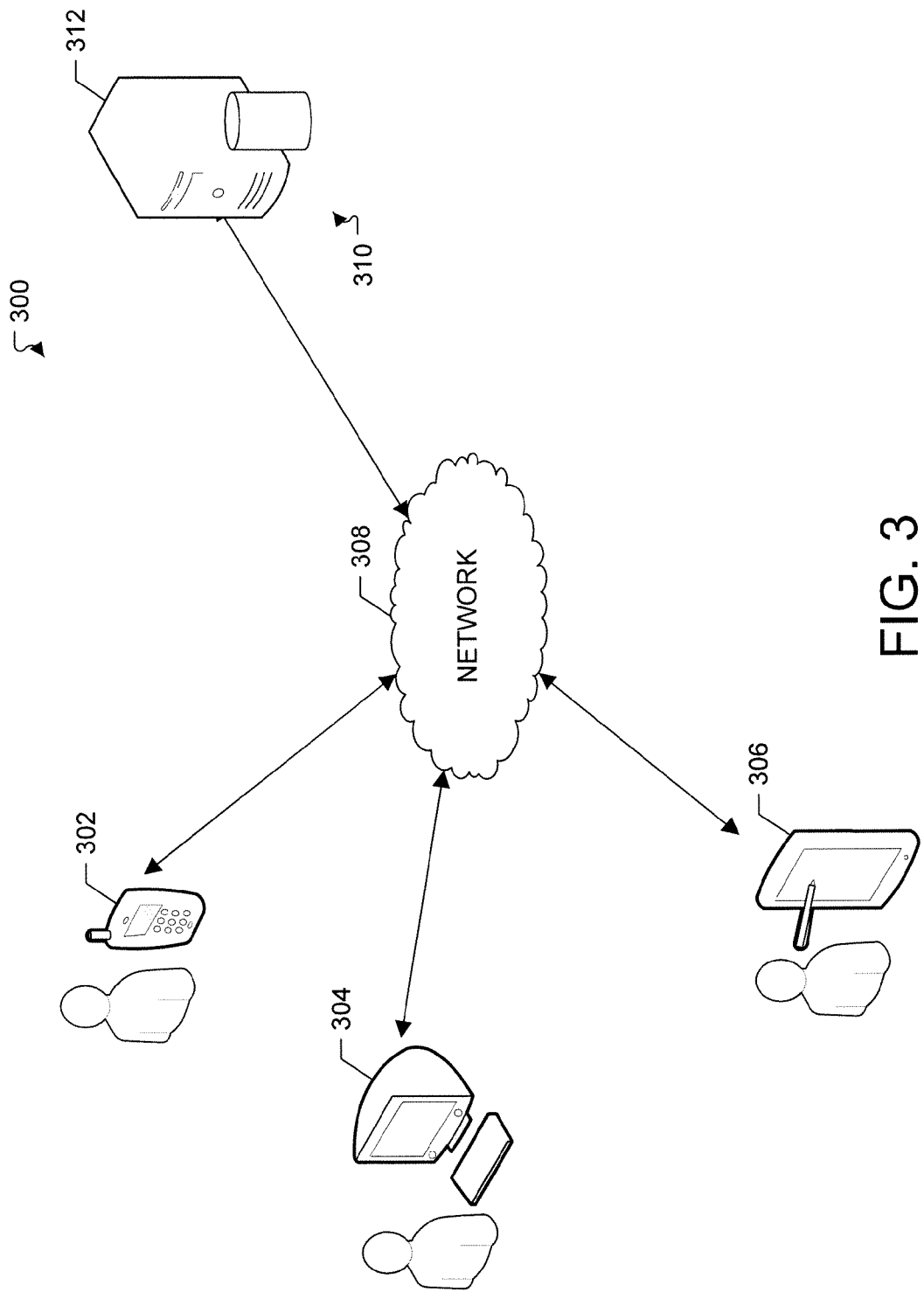
FIG. 3 illustrates an example distributed network environment which can provide for processing a touch element on a device.

FIG. 3 illustrates an example distributed network environment which can provide for processing touch elements of an application of a device. A network environment 300 includes a number of electronic devices 302-306 communicably connected to a server 310 by a network 308. Each of electronic devices 302-306 can include a touch screen, which can be built into the device itself or can be electronically connected to the device (e.g., as a peripheral device). Server 310 includes a processing device 312 and a data store 314. Processing device 312 executes computer instructions stored in data store 314, for example, to provide content (e.g., application data, a website, or other display content) to any of electronic devices 302-306.

In some example aspects, each of the electronic devices 302-306 may be any machine with appropriate hardware/software to process touch elements of an application of a device. Electronic devices 302-306 can be mobile devices (e.g., smartphones, tablet computers, PDAs, and laptop computers), portable media players, desktop computers or other appropriate computing devices. In the example of FIG. 3, electronic device 302 is depicted as a smartphone, electronic device 304 is depicted as a desktop computer, and electronic device 306 is depicted as a tablet computer.

In some example aspects, any of the electronic devices 302-306 may obtain application data and content corresponding to the application data can be displayed on a touch screen of the electronic device (e.g., 302-306). The content corresponding to the application data can include a graphical user interface. The content can also include text (e.g., a document, an article, etc.) or a web link. Of course, other types of content can also be obtained. In some example aspects, the content can be transmitted from server 310 via the network 308 to the electronic devices 302-306. In other example aspects, the content can be stored in a storage component (e.g., hard disk, RAM, ROM, etc.) of the respective electronic devices 302-306.

Server 310 may be any system or device having a processor, a memory, and communications capability for providing content to the electronic devices. In some example aspects, server 310 can be a single computing device such as a computer server. In other embodiments, server 310 can represent more than one computing device working together to perform the actions of a server computer (e.g., cloud computing).

Network 308 can include, for example, any one or more of a cellular network, a satellite network, a personal area network (PAN), a local area network (LAN), a wide area network (WAN), a broadband network (BBN), the Internet, and the like. Further, the network 308 can include, but is not limited to, any one or more of the following network topologies, including a bus network, a star network, a ring network, a mesh network, a star-bus network, tree or hierarchical network, and the like.

Figure 4:
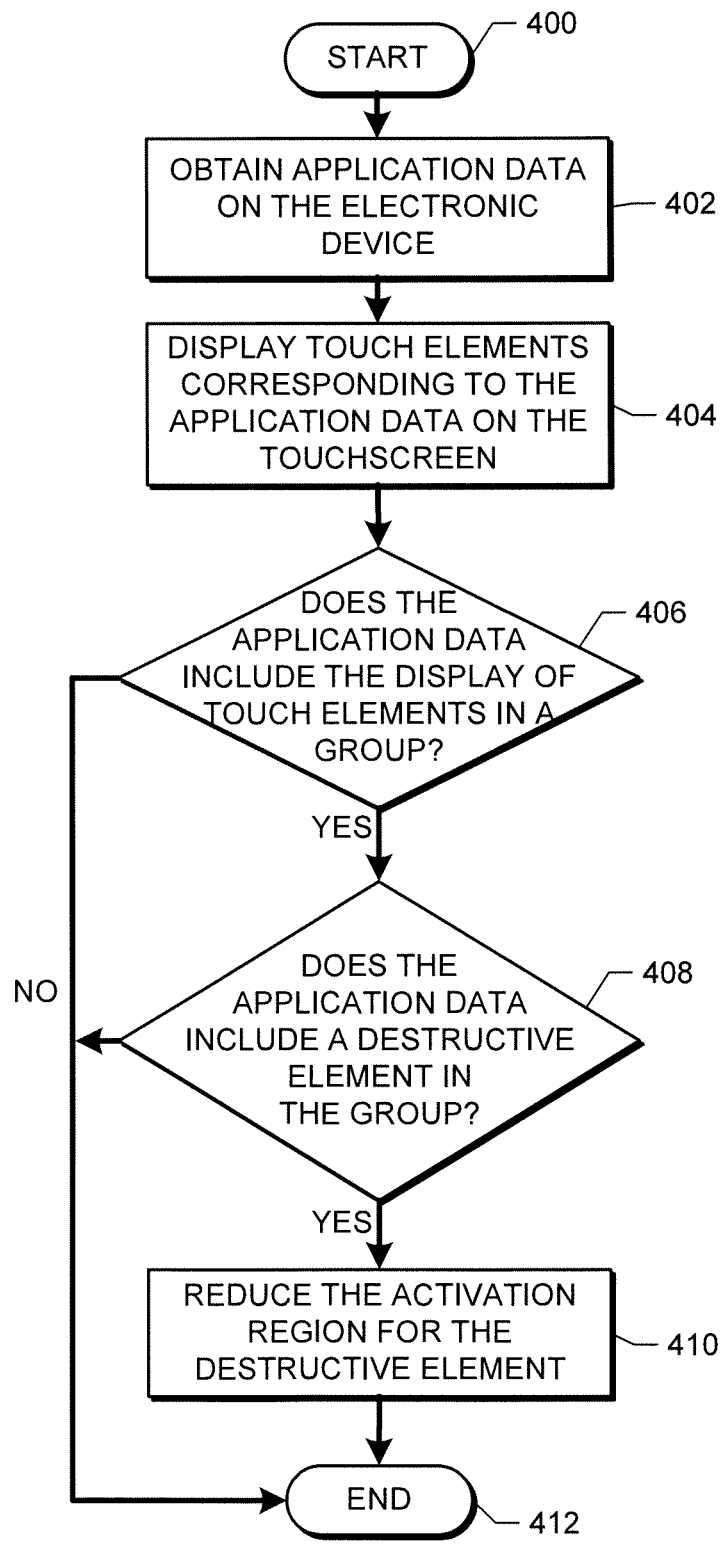
FIG. 4 illustrates an example process by which an activation area is modified on a touch screen device.

FIG. 4 illustrates an example process by which an activation area is modified on a touch screen device. Following start block 400, application data is obtained on the device at step 402. The application data can correspond to a graphical user interface having a plurality of touch elements.

At step 404, the graphical user interface corresponding to the application 120 is displayed on a touch screen of the device. At decision step 406, an inquiry is made as to whether the application data includes touch elements that are to be displayed in a group.

If the answer to the inquiry at decision step 406 is no, the process ends at end block 412. For example, if the application data does not include touch elements that are to be displayed in a group, the process can refrain from altering the size of the activation area of the touch elements.

If the answer to the inquiry at decision step 406 is yes, then at decision step 408, an inquiry is made as to whether the group includes a destructive touch element, that is, a touch element that is configured to delete, close, exit, or perform an action that a user may want to "undo."

If the answer to the inquiry at decision step 408 is no, the process ends at end block 412. For example, if the application data does not include a destructive touch element, the process can refrain from altering the size of the activation area of the touch elements.

If the answer to the inquiry at decision step 408 is yes, then at step 410 the activation area for the destructive touch element is reduced. The activation area of adjacent, non-destructive touch elements may be increased. By reducing the activation area of the destructive touch element, the likelihood of inadvertent activation of the destructive touch element may be reduced. Although the activation area for the touch elements may be altered, a border surrounding each touch element that is displayed to the user, remains unchanged.

One or more portions of the activation area formerly comprising the destructive touch element may be reapportioned to one or more adjacent non-destructive touch elements. Alternatively, the activation area formerly comprising the destructive or low priority touch element may not be reapportioned to adjacent touch elements, such that dead space may be present between the destructive touch element and the non-destructive touch elements.

The user may activate the destructive touch element by touching an area within the reduced activation area. If the user touches an area that is within the border of the destructive touch element, but adjacent to the non-destructive touch elements, then the area touched will likely belong to the adjacent non-destructive touch elements even though the area touched may be within the border of the destructive touch element. Inadvertent activation of the destructive touch element is thus prevented. The process then ends at end block 412.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
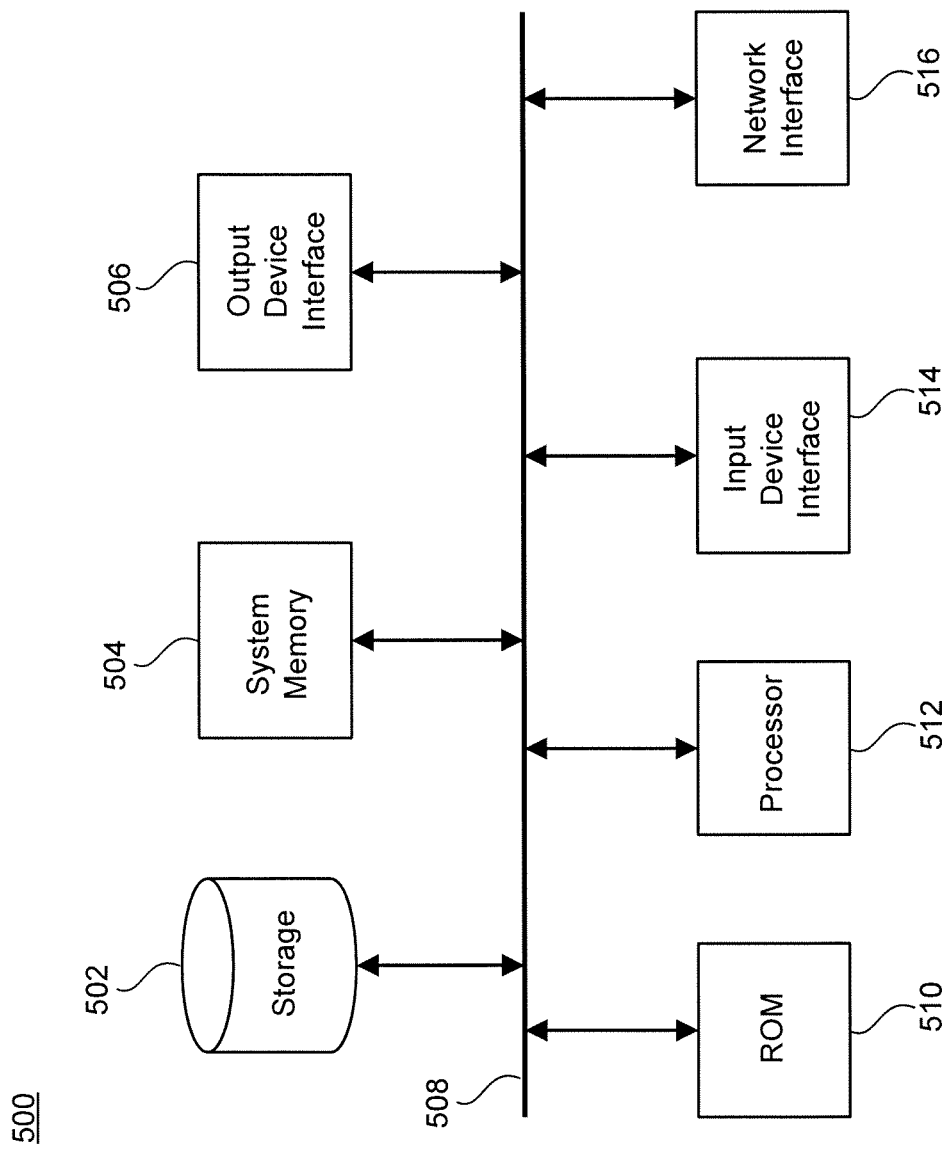
FIG. 5 conceptually illustrates an electronic system with which some implementations of the subject technology are implemented.

FIG. 5 conceptually illustrates an electronic system with which some implementations of the subject technology are implemented. Electronic system 500 can be a computer, phone, PDA, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for processing touch elements of an application in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touch screen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A machine-implemented method for processing touch elements of an application for a device, the method comprising:
    receiving application data associated with the application, the application data providing for the touch elements, each of the touch elements comprising an activation area configured to receive a user input and to trigger at least one function of the application upon receiving the user input;
    determining, from the application data, that plural ones of the touch elements are for display in a group of touch elements in the application;
    classifying, before the application receives a touch input and in response to the determining, each of the touch elements of the group into one of a predetermined number of categories comprising a destructive category and a non-destructive category based on an application function of the touch element; and
    reducing, before the application receives a touch input, a predetermined size of a respective activation area for at least one of the touch elements if the at least one of the touch elements is classified in the destructive category, and increasing the predetermined size of the respective activation area for the at least one of the touch elements if the at least one of the touch elements is classified in the non-destructive category, the respective activation area being changed to a size that is different than a displayed size of the at least one of the touch elements, the displayed size remaining unchanged,
    wherein an application function for the destructive category comprises a delete, close or exit application function, and wherein an application function for the non-destructive category comprises a maximize, favorite, or minimize application function.

2. A device, comprising:
    a touch screen;
    one or more processors; and
    a machine-readable medium comprising instructions stored therein, which when executed by the one or more processors, cause the one or more processors to perform operations comprising:
        determining, from application data associated with an application for the device, that a plurality of touch elements are for display in a group in the application, wherein each of the touch elements comprises an activation area configured to receive a user input and to trigger at least one function of the application upon receiving the user input;
        classifying, before the application receives a touch input and in response to the determining, each of the touch elements of the group into one of a predetermined number of categories comprising a destructive category and a non-destructive category based on the application function of the touch element;
        reducing, before the application receives a touch input, a predetermined size of a respective activation area for at least one of the touch elements if the at least one of the touch elements is classified in the destructive category, and increasing the predetermined size of the respective activation area for the at least one of the touch elements if the at least one of the touch elements is classified in the non-destructive category, the respective activation area being changed to a size that is different than a displayed size of the at least one of the touch elements, the displayed size of the at least one of the touch elements remaining unchanged; and
        allocating a portion of the activation area of at least one of the touch elements to another touch element,
        wherein an application function for the destructive category comprises a delete, close or exit application function, and wherein an application function for the non-destructive category comprises a maximize, favorite, or minimize application function.

3. A machine-readable medium comprising instructions stored therein, which when executed by a system, cause the system to perform operations comprising:

receiving application data associated with an application for a device, the application data providing for multiple touch elements, each of the touch elements comprising an activation area configured to receive a user input;

determining, from the application data, that plural ones of the touch elements are for display in a group of touch elements in the application;

classifying, before the application receives a touch input and in response to the determining, each of the touch elements of the group into one of a predetermined number of categories comprising a destructive category and a non-destructive category;

reducing, before the application receives a touch input, a predetermined size of a respective activation area for at least one of the group of touch elements if the at least one of the touch elements is classified in the destructive category, and increasing the predetermined size of the respective activation area if the at least one of the group of touch elements is classified in the non-destructive category, the respective activation area being changed to a size that is different than a displayed size of the at least one of the group of touch elements, the displayed size remaining unchanged; and allocating a portion of the activation area of the at least one touch element to an adjacent touch element based on the classification, wherein an application function for the destructive category comprises a delete, close or exit application function, and wherein an application function for the non-destructive category comprises a maximize, favorite, or minimize application function.

4. The machine-implemented method of claim 1, further comprising:
determining that a first touch element of the touch elements is classified in the destructive category; and
reducing a size of an activation area of the first touch element.

5. The machine-implemented method of claim 1, further comprising:
determining that a first touch element of the touch elements is classified in the non-destructive category; and
increasing a size of an activation area of the first touch element.

6. The machine-implemented method of claim 5, further comprising:
determining that a second touch element of the touch elements is classified in the non-destructive category; and
increasing a size of an activation area of the second touch element.

7. The machine-implemented method of claim 6, wherein the activation areas of the first and second touch elements are equally increased.

8. The machine-implemented method of claim 6, wherein the activation area of the first touch element is increased to a larger size than the activation area of the second touch element.

9. The machine-implemented method of claim 6, wherein, after the activation areas of the first and second touch elements are increased, the activation area of the first touch element has a different number of sides than the activation area of the second touch element.

10. The machine-implemented method of claim 1, further comprising:
classifying a first touch element of the touch elements into either the destructive category or the non-destructive category;
changing a size of an activation area of the first touch element consistent with the classification of the first touch element,
wherein the activation area of the first touch element is changed from a four-sided shape to a five-sided having an angle representative of a corner of the four-sided shape.

11. The device of claim 2, wherein the instructions, when executed, further cause the one or more processors to perform operations comprising:
determining that a first touch element of the plurality of touch elements is classified in the non-destructive category; and
increasing a size of an activation area of the first touch element.

12. The device of claim 11, wherein the instructions, when executed, further cause the one or more processors to perform operations comprising:
determining that a second touch element of the plurality of touch elements is classified in the non-destructive category;
increasing a size of an activation area of the second touch element.

13. The device of claim 12, wherein the activation areas of the first and second touch elements are equally increased.

14. The device of claim 12, wherein the activation area of the first touch element is increased to a larger size than the activation area of the second touch element.

15. The device of claim 12, wherein, after the activation areas of the first and second touch elements are increased, the activation area of the first touch element has a different number of sides than the activation area of the second touch element.

16. The device of claim 2, wherein the instructions, when executed, further cause the one or more processors to perform operations comprising:
determining that a first touch element of the plurality of touch elements is classified in the destructive category;
reducing a size of an activation area of the first touch element; and
positioning, within a displayed area of the first touch element, the decreased activation area furthest away from an adjacent touch element.

17. The machine-readable medium of claim 3, wherein the instructions, when executed by the system, further cause the system to perform operations comprising:
determining that a first touch element of the plurality of touch elements is classified in a destructive category;
decreasing a size of an activation area of the first touch element; and
positioning, within a displayed area of the first touch element, the decreased activation area furthest away from an adjacent touch element.

18. The machine-readable medium of claim 3, further comprising:
determining that a first and a second touch element of the plurality of touch elements are classified in the non-destructive category; and
increasing respective sizes of respective activation areas for the first and second touch elements.

19. The machine-readable medium of claim 18, wherein the activation area of the first touch element is increased to a larger size than the activation area of the second touch element.

20. The machine-readable medium of claim 18, wherein, after the activation areas of the first and second touch elements are increased, the activation area of the first touch element has a different number of sides than the activation area of the second touch element.

* * * * *